US012559933B2

(12) United States Patent
Landers et al.

(10) Patent No.: US 12,559,933 B2
(45) Date of Patent: Feb. 24, 2026

(54) TRANSPORTABLE, RECONFIGURABLE HARSH ENVIRONMENT WORKSPACE

(71) Applicant: Civil-Military Innovation Institute Inc., Morgantown, WV (US)

(72) Inventors: Adam Landers, Morgantown, WV (US); Walter Hatfield, Morgantown, WV (US); Zenovy Wowczuk, Morgantown, WV (US); Borys Wowczuk, Morgantown, WV (US); Yurij Wowczuk, Morgantown, WV (US)

(73) Assignee: Civil-Military Innovation Institute Inc., Morgantown, WV (US)

( * ) Notice: Subject to any disclaimer, the term of this patent is extended or adjusted under 35 U.S.C. 154(b) by 0 days.

(21) Appl. No.: 18/771,429

(22) Filed: Jul. 12, 2024

(65) Prior Publication Data

US 2025/0019959 A1 Jan. 16, 2025

Related U.S. Application Data

(60) Provisional application No. 63/526,582, filed on Jul. 13, 2023.

(51) Int. Cl.
*E04B 1/343* (2006.01)
*B60P 3/14* (2006.01)
(52) U.S. Cl.
CPC .............. *E04B 1/3431* (2013.01); *B60P 3/14* (2013.01)
(58) Field of Classification Search
CPC .............. E04B 1/3431; E04B 1/34305; E04H 2001/1283; B60P 3/14
See application file for complete search history.

(56) References Cited

U.S. PATENT DOCUMENTS

| | | | | |
|---|---|---|---|---|
| 3,877,671 A | * | 4/1975 | Underwood | ......... B61D 45/002 |
| | | | | 410/97 |
| 4,570,733 A | * | 2/1986 | Star | .......................... B60P 3/14 |
| | | | | 180/41 |

(Continued)

FOREIGN PATENT DOCUMENTS

| BR | 102013019221 A2 | 12/2017 |
|---|---|---|
| CN | 102136176 A | 7/2011 |

(Continued)

OTHER PUBLICATIONS

PCT/US2024/037713—International Search Report and Written Opinion, Nov. 11, 2024, 14 pages.

(Continued)

*Primary Examiner* — Christine T Cajilig
(74) *Attorney, Agent, or Firm* — Goodwin Procter LLP

(57) ABSTRACT

Disclosed is an example of a movable workspace configured to operate in a harsh environment. The exemplary movable workspace includes a primary compartment and a deployable expansion compartment. The primary compartment may have a primary workspace, and at least one primary connection point adapted to releasably secure work equipment within the primary workspace. The deployable expansion compartment may have an expansion workspace, and at least one expansion connection point adapted to secure the work equipment within the expansion workspace. The movable workspace may include a movement component to facilitate movement of the movable workspace either on its own or with assistance from a transport vehicle. The movable workspace is configured to be transported in a transport state in which the expansion workspace meshes with the primary workspace. Upon delivery at a work site, the expansion workspace extends from the primary workspace to place the movable workspace in a work state.

24 Claims, 10 Drawing Sheets

(56) References Cited

U.S. PATENT DOCUMENTS

| | | | | |
|---|---|---|---|---|
| 4,643,476 | A | 2/1987 | Montgerard | |
| 5,090,749 | A * | 2/1992 | Lee | B60P 3/34 |
| | | | | 296/171 |
| 6,108,983 | A * | 8/2000 | Dewald, Jr. | B60P 3/34 |
| | | | | 296/26.14 |
| 6,698,818 | B2 * | 3/2004 | Crean | B60P 3/34 |
| | | | | 5/118 |
| 6,776,570 | B1 | 8/2004 | Thobe et al. | |
| 7,290,817 | B1 | 11/2007 | Delasse | |
| 7,418,802 | B2 * | 9/2008 | Sarine | E04B 1/34305 |
| | | | | 52/79.5 |
| 7,966,775 | B2 * | 6/2011 | Medley | E04B 1/3444 |
| | | | | 52/79.5 |
| 8,347,560 | B2 * | 1/2013 | Gyory | E04B 1/34363 |
| | | | | 52/79.5 |
| 9,067,525 | B1 * | 6/2015 | Ninov | B60P 1/43 |
| 9,916,701 | B2 | 3/2018 | Angus et al. | |
| 9,919,444 | B2 | 3/2018 | Tomblin et al. | |
| 10,640,998 | B2 | 5/2020 | Andersen et al. | |
| 10,773,306 | B2 | 9/2020 | Nicaise | |
| 11,062,534 | B2 | 7/2021 | Jingle et al. | |
| 11,066,003 | B1 * | 7/2021 | Condie | E04H 1/1205 |
| 2003/0213185 | A1 * | 11/2003 | Findley | E04B 1/3431 |
| | | | | 52/64 |
| 2007/0102946 | A1 * | 5/2007 | Blackwell | E04H 3/08 |
| | | | | 296/24.38 |
| 2009/0044460 | A1 * | 2/2009 | Medley | E04B 1/3444 |
| | | | | 52/741.1 |
| 2009/0199492 | A1 * | 8/2009 | Gibson | E04B 1/3431 |
| | | | | 52/79.8 |
| 2014/0360105 | A1 * | 12/2014 | Trout | E04B 1/3431 |
| | | | | 52/79.5 |
| 2019/0356035 | A1 * | 11/2019 | Dominguez | E04H 12/182 |

FOREIGN PATENT DOCUMENTS

| | | | | |
|---|---|---|---|---|
| CN | 203623483 | U | 6/2014 | |
| CN | 205075700 | U | 3/2016 | |
| CN | 205202802 | U | 5/2016 | |
| CN | 105868885 | A | 8/2016 | |
| CN | 206231598 | U | 6/2017 | |
| CN | 107628570 | A | 1/2018 | |
| CN | 108122094 | A | 6/2018 | |
| CN | 208126124 | U | 11/2018 | |
| CN | 109284884 | A | 1/2019 | |
| CN | 209833464 | U | 12/2019 | |
| CN | 111169365 | A | 5/2020 | |
| CN | 112865994 | A | 5/2021 | |
| CN | 114040270 | A | 2/2022 | |
| CN | 216034019 | U | 3/2022 | |
| CN | 114415593 | A | 4/2022 | |
| DE | 102021132778 | A1 * | 6/2023 | B60P 3/34 |
| EP | 3152081 | B1 | 1/2020 | |
| FR | 2475505 | A1 * | 8/1981 | B65D 88/121 |
| JP | 2005145632 | A | 6/2005 | |
| JP | 5259171 | B2 | 8/2013 | |
| KR | 101500299 | B1 | 3/2015 | |
| KR | 102203809 | B1 | 1/2021 | |
| RU | 2003519 | C1 | 11/1993 | |
| RU | 2057659 | C1 | 4/1996 | |
| RU | 2162231 | C1 | 1/2001 | |
| RU | 2210512 | C2 | 8/2003 | |
| RU | 96837 | U1 | 8/2010 | |
| RU | 155756 | U1 | 10/2015 | |
| RU | 168580 | U1 | 2/2017 | |
| RU | 172434 | U1 | 7/2017 | |
| RU | 191396 | U1 | 8/2019 | |
| SU | 1482836 | A1 | 5/1989 | |
| WO | WO-2014128120 | A2 * | 8/2014 | E04H 5/10 |
| WO | WO-2015079273 | A1 * | 6/2015 | B01L 99/00 |
| WO | WO-2019233483 | A1 | 12/2019 | |
| WO | WO-202212951 | A1 | 1/2022 | |

OTHER PUBLICATIONS

Wozniak, et al., "Chosen elements of army maintenance—repair infrustructure", Eksploatacja i Testy, Autobusy, Aug. 2016: pp. 182-195 (14 pages).
Furch, et al., "Design of Container Workplace for Performing Maintenance of Lamd Combat Vehicles in Field Conditions", Scientific Journal of the Military University of Land Forces, vol. 161, No. 3: pp. 323-333. DOI:10.5604/01.3001.0002.3109.

* cited by examiner

TRANSPORTABLE, RECONFIGURABLE HARSH ENVIRONMENT WORKSPACE

CROSS-REFERENCE TO RELATED APPLICATION

This application claims priority to and the benefit of U.S. Provisional Patent Application No. 63/526,582, filed Jul. 13, 2023, the entire contents of which are incorporated herein by reference for all purposes.

BACKGROUND

In a field setting, such as a harsh environment setting including a battlefield setting or forward setting, equipment breaks, becomes depleted, or needs refurbishing, and facilities to repair the equipment are not readily available. Current repair processes require de-issuing equipment and sending the damaged or broken equipment or component back to a repair facility away from the harsh environment (i.e., a facility at the rear) where the damaged or broken equipment may be repaired. In the meantime, the users (i.e., soldiers) have to request a replacement which typically takes a week or longer. While mobile work places have been provided, these offer limited capabilities for repair or replenishment, and do not enable workers to occupy and reconfigure equipment, especially larger tools that cannot be handheld, within the work space.

What is needed is a transportable and/or mobile workspace that enables workers to occupy the workspace, reconfigure the workspace, move work equipment into and out of the workspace, thereby enabling repair of the damaged or broken equipment or component at the battlefield or forward setting.

SUMMARY

In one aspect, a movable workspace is provided. The movable workspace includes a primary compartment and a deployable expansion compartment. The primary compartment may have a primary workspace having a primary area, and at least one primary connection point adapted to releasably secure work equipment within the primary workspace. The deployable expansion compartment may have an expansion workspace having an expansion area, and at least one expansion connection point adapted to secure the work equipment within the expansion workspace. The movable workspace also includes a movement component to facilitate movement of the movable workspace.

Also provided is a reconfigurable, transportable enclosed workspace that includes a primary enclosed work area and an extending enclosed work area. The primary enclosed work area may include a plurality of work equipment connection points adapted to enable work equipment to be releasably secured in the primary enclosed work area. The extending enclosed work area may have a plurality of extended work equipment connection points adapted to enable the work equipment to be releasably secured in the extending enclosed work area. The extending enclosed work area may be configured to mesh with the primary enclosed work area when the reconfigurable, transportable enclosed workspace is in a transport state, and extend from the primary enclosed work area when the reconfigurable, transportable enclosed workspace is in a work state.

DETAILED DESCRIPTION

The following discussion describes a mobile makerspace (or design shop) that is deployable into battlefield situations. An issue in battle zone settings is that equipment often breaks or needs to be repaired, but the facilities capable of performing such repairs are not readily available in the battlefield. The following examples describe an exemplary movable workspace, which is also referred to herein as a reconfigurable, transportable enclosed workspace. Embodiments of the exemplary movable workspace includes areas for a design/machine shop incorporated into a mobile facility (e.g., transportable under its own power or by a vehicle) that can be delivered into and out of a battlefield or battle zone. The mobile workspace can include tools/products that enable the repair or fabrication of parts/equipment needed in the field (e.g., 3D printers, machine shop tools, and like).

Figure 1A:
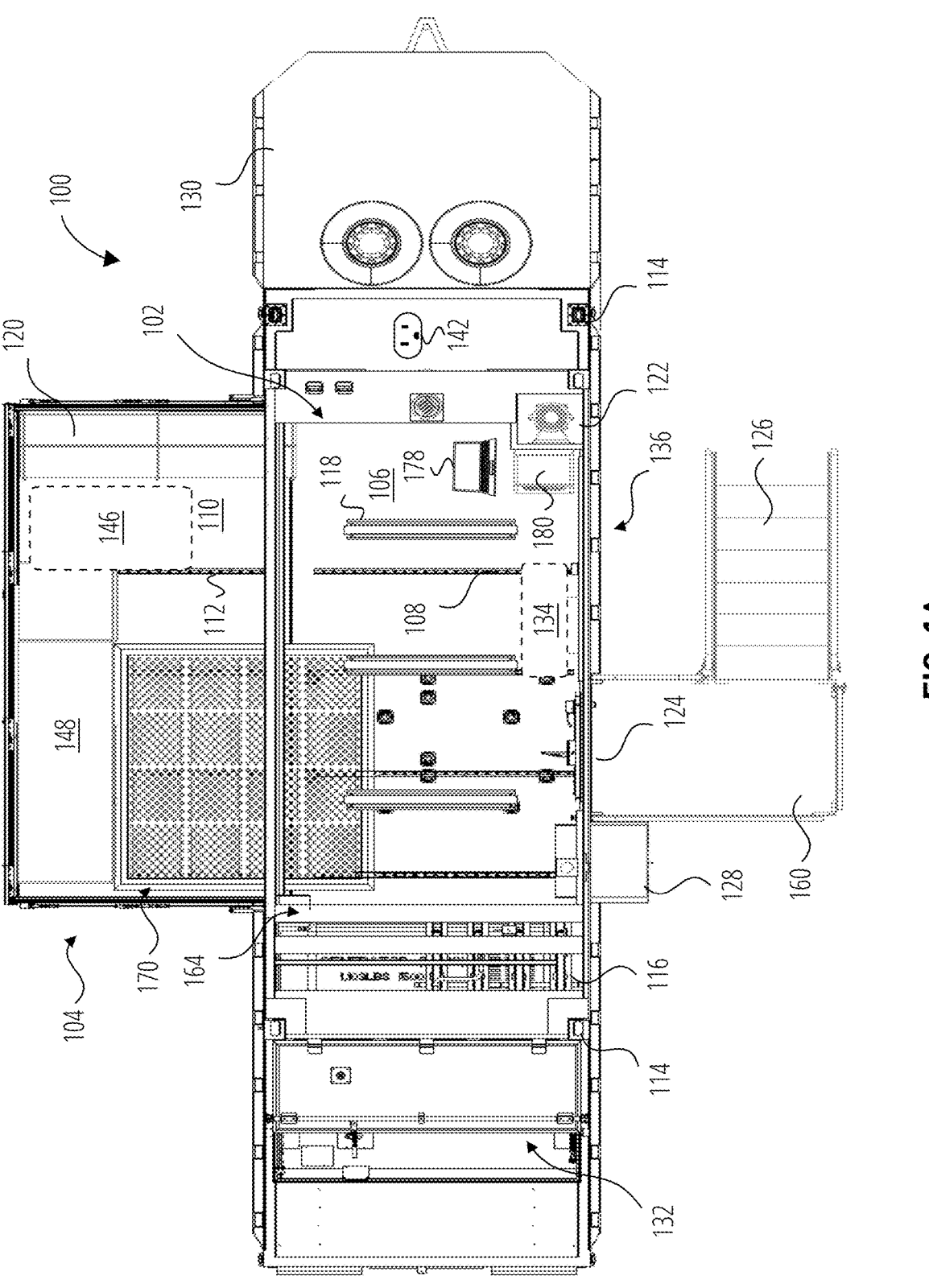
FIG. 1A illustrates a cutaway, top view of an exemplary workspace/container according to the disclosed subject matter.

FIG. 1A illustrates a top view of an exemplary workspace/container according to the disclosed subject matter. The movable workspace 100 includes a primary compartment 102, a deployable expansion compartment 104, and a movement component 114. The movable workspace 100 may also be referred to herein as a reconfigurable, transportable enclosed workspace, and the terms may be used interchangeably. The primary compartment 102 may also be referred to herein as a primary enclosed work area and the terms may be used interchangeably. The deployable expansion compartment 104 may also be referred to herein as an extending enclosed work area, and the terms may be used interchangeably.

The primary compartment 102 and the deployable expansion compartment 104 provide configuration that enables the maximization of working space in the movable workspace 100 by expanding or extending the deployable expansion compartment 104 from within a meshed configuration with the primary compartment 102 (i.e., a transport state) to a work state.

While a top to the movable workspace 100 is not shown in this top view in FIG. 1A, it is envisioned that the movable workspace 100 has a top or roof that is a rigid roof structure that couples to the sides or walls of the movable workspace 100 to provide structural integrity. The top or roof is opposite a floor or bottom of the movable workspace 100.

The primary compartment 102 includes a primary workspace 106 and at least one primary connection point 108.

The primary workspace 106 has a primary area that is a space that contains one or more of the primary connection points 108 and is reconfigurable to allow work equipment and workers to occupy primary workspace 106. The primary connection point may be adapted to releasably secure work equipment 134 within the primary workspace 106.

In addition, the deployable expansion compartment 104 includes an expansion workspace 110 having an expansion area within which is at least one expansion connection point 112. The expansion connection point 112 is adapted to secure work equipment, such as work equipment 146 within the expansion area. In addition, the expansion connection point 112 may include many connection points that are configured to enable work equipment, workbenches and the like to be securely positioned and repositioned at various locations within the deployable expansion compartment 104.

In an example, the expansion connection point 112 and the primary connection point 108 may be aligned to allow work equipment 134 or work equipment 146 to be secured in and be positioned between both the primary workspace 106 and the expansion workspace 110. For example, a first end of work equipment 146 may be positioned in primary workspace 106 while a second end of the work equipment 146 may be positioned in the expansion workspace 110.

The reconfigurable, transportable enclosed workspace 100 includes a primary enclosed work area 102 and an extending enclosed work area 102. The primary enclosed work area 102 may interchangeably be referred to as primary enclosed work area 102 so both will be referred to by the same reference number. Similarly, the deployable expansion compartment 104 and the extending enclosed work area are the same; accordingly, the extending enclosed work area may also be referred to as extending enclosed work area 104. The extending enclosed work area 104 is configured to mesh with the primary enclosed work area 102 when the reconfigurable, transportable enclosed workspace 100 in a transport state, and extend from the primary enclosed work area 102 when the reconfigurable, transportable enclosed workspace 100 is in a work state.

The expansion workspace 110 may also include an expansion connection point 112, a removable storage shelving 120, a work bench 148 as well as work equipment 146. The expansion connection point 112, which is a multitude of connection points, such as a track system, is operable to secure the work equipment 146 within the expansion workspace 110. In addition, the expansion connection point(s) 112 is also operable to permit location of the work equipment 146 within the expansion workspace 110 to be changed (or reconfigured). For example, the work equipment 146 may be unsecured from expansion connection point 112 and moved either within the expansion workspace 110 or into the primary workspace 106 to allow for additional or other work equipment to be placed within the movable workspace 100. The expansion workspace 110 may increase the square footage of the movable workspace 100 to provide 20%, 30%, 45%, 70%, or the like of additional workspace to the amount of workspace provided in the primary workspace 106. For example, the expansion workspace 110 may provide, for example, an additional 87 square feet of workspace to the primary workspace.

In a further example, the expansion workspace 110 may be equipped with removable storage shelving 120. "Removable storage shelving" refers to shelving that is releasably secured to a wall of the workspace.

In a corner of the primary compartment 102, an antenna 122 is provided to aid with establishing and/or maintaining communications with other entities and users, such as, for example commanding officers, supply personnel, soldiers, and the like. The communication equipment 178 may be coupled to the antenna 122.

The primary compartment 102 (i.e., primary enclosed work area) may include a main entry 124. "Main entry" refers to an entryway for occupants of the movable workspace to enter and exit the movable workspace. A stairway 126 may be coupled to a platform 160 that enables occupants to enter the movable workspace 100. While a stairway 126 is shown, the stairway 126 may easily be replaced or paired with a ramp, a wheelchair lift, an elevator, or the like, to enable injured or disabled persons, handicapped persons, and/or patients to enter and exit the reconfigurable, transportable enclosed workspace 100.

The movable workspace 100 also includes a number of additional features such as an air conditioner/heater 128, rear doors 132, a work equipment 134, and at least one electrical outlet 142.

For example, the rear doors 132 enable access to an electrical power source 116 that may be an electrical generator, an electrical supply cable connectable to a generator, an external electrical power supply system, renewable energy generator (e.g., a windmill, a submersible turbine, solar panels), battery pack, or the like. The electrical power source 116 is operable to provide electrical power to a number of devices within the movable workspace 100. One or more electrical override switches within primary workspace 106, expansion workspace 110, or on the exterior of the movable workspace 100 may be provided to shut off all power for safety. For example, the movable workspace 100 includes lighting fixtures 118, which may light emitting diode (LED) lighting, which are capable of producing visible light or near infrared light within substantially all of the interior space of the movable workspace 100. The electrical outlet 142 is representative of a number of outlets and they may be located within the primary workspace 106 and the expansion workspace 110 and may be of different voltages, such as 110/120 and 220/240 VAC as well possibly direct current. In addition, when the movable workspace 100 is equipped with an electrical power source 116, the electrical power source 116 may be separated by separating wall 164 from the primary workspace 106.

The movement component 114 of the movable workspace 100 may be a structure or device that facilitates movement of the movable workspace 100 in any direction. The structure or device may include one or more coupling points adapted to allow the movable workspace to be transported by a transport vehicle and a device may be a pulley system, a winch, a ratchet, an engine, hydraulic transport system, electromechanical transport system, or an electric motor. For example, the one or more coupling points of a movement component 114 may be incorporated in the corners of the movable workspace 100 and that are accessible at the top or roof of the 100.

In addition, the movable workspace 100 may be configured to be secured to a transport trailer 130. The transport trailer 130 may be a wheeled platform, such as a trailer or the like, that is configured to be coupled to a transport vehicle, such as a truck, tractor, armored vehicle, or the like, that transports the movable workspace 100 to a work location. For example, the transport trailer 130 may be configured to traverse nearly any type of terrain represented by surface 144, such as dirt, concrete, asphalt, ice, snow, sand, and the like. While shown with wheels, the transport trailer 130 may be equipped with tracks or skis to enable transport over diverse types of terrain.

Different safety features are also included in either the primary workspace 106 or expansion workspace 110, such as an internal eye wash station 180, an emergency electrical power disconnect (not shown in this example), first aid kits (not shown), and the like. Other attributes of movable workspace 100 may include a waterfall outlet box (not shown), and an on-demand, hot water system (not shown).

Figure 1B:
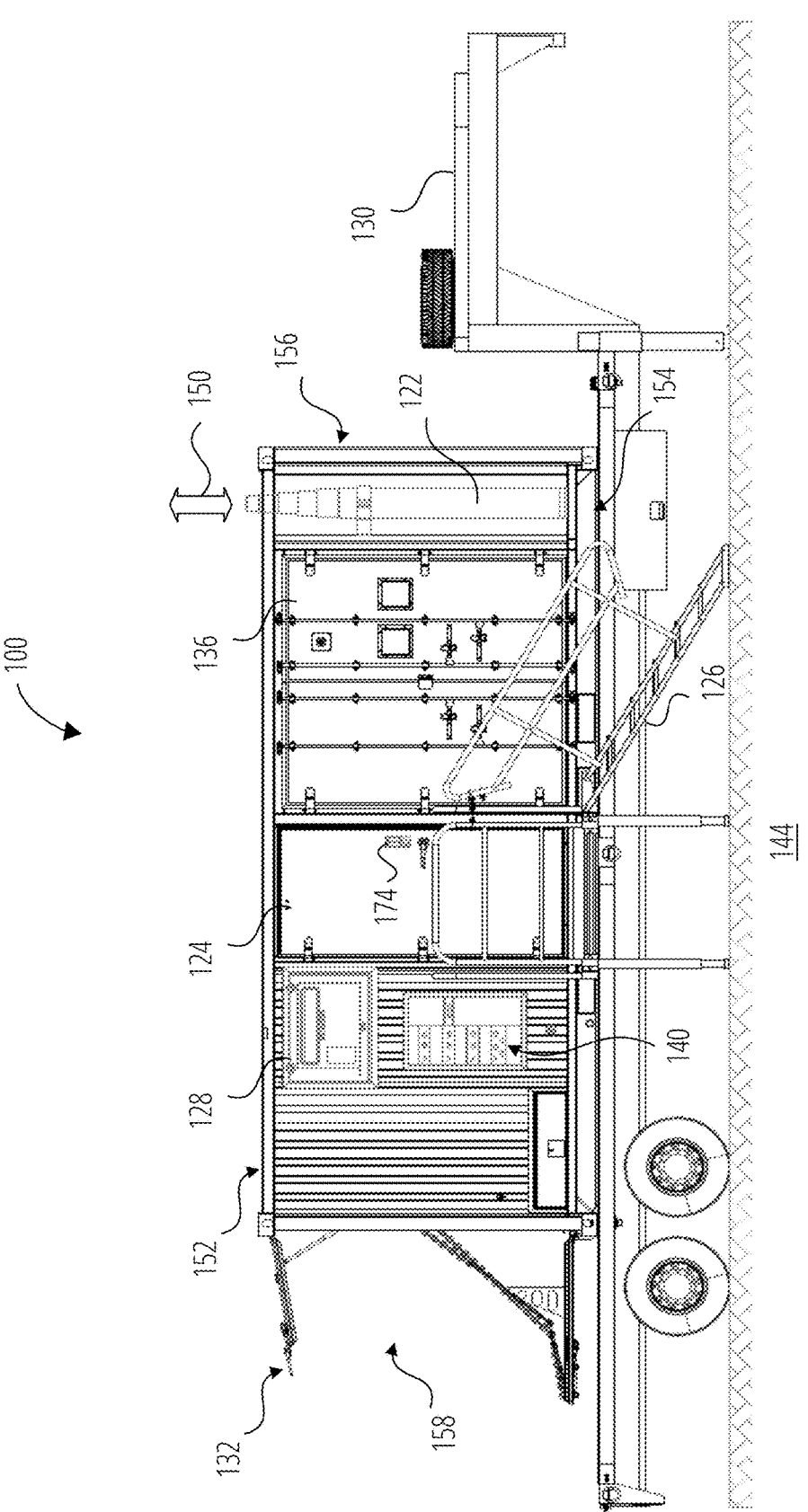
FIG. 1B illustrates a side view of the exemplary workspace/container of FIG. 1A.

FIG. 1B illustrates a side view of the exemplary workspace/container of FIG. 1A. The side view illustrated in FIG. 1B shows further details of previously presented features of the movable workspace 100 as well as additional features. The movable workspace 100 is shown positioned on a transport trailer 130. The movable workspace 100 includes a top/roof 152, a floor or bottom 154, a front side 156 and a rear side 158.

The antenna 122 may be positioned in a corner near the front side 156, and be formed of a number of segments that are operable to extend upwards and retract downwards (in a telescoping manner) in the direction of telescoping antenna 150 out of an opening or door in the top/roof 152 of the movable workspace 100.

As shown the example of FIG. 1B, the main entry 124 may be positioned approximately at a center of the side of the movable workspace 100. The main entry 124 may include a cipher lock 174 to prevent unauthorized entry. In this example, the platform 160 that is coupled to the stairway 126 may be positioned level with a bottom of the main entry 124 and may be connected to an outer portion of the floor or bottom 154, to a part of the transport trailer 130, or both.

In some embodiments, the air conditioner/heater 128 is positioned toward the rear side 158 of the movable workspace 100 with respect to the main entry 124 and above the power entry 140. The power entry 140 may, for example, be configured to receive an electrical power cable from the electrical power source 116 when the electrical power source 116 is a shore cable or external power source. Additionally, or alternatively, the power entry 140 may be configured as an electrical distribution point for work equipment within the movable workspace 100 as well as equipment and devices outside of the movable workspace 100.

In this example, the rear doors 132 are shown in a clamshell configuration where a top door opens upward and a bottom door opens downward. Of course, other configurations for the rear doors 132 are envisioned such as a side-by-side arrangement, such as that shown for side doors 136. As shown in FIG. 1B, the side doors 136 may be configured in a side-by-side arrangement and serve as another entryway that is configured to allow work equipment, workbenches, equipment, or items in need of repair, refurbishment, or replenishment, and larger equipment and devices to be placed in and removed from the movable workspace.

In an embodiment, the doors, such as main entry 124, rear doors 132, side doors 136, and optionally antenna opening (not shown), may include waterproof seals and/or gasproof seals that are operable to prevent water penetration up to a depth of 10 meters for 12 hours, 20 meters for 3 hours in the case of submersion in water, or in case of the presence of a lethal and/or non-lethal gas to prevent the gas from entering the movable workspace 100.

Figure 1C:
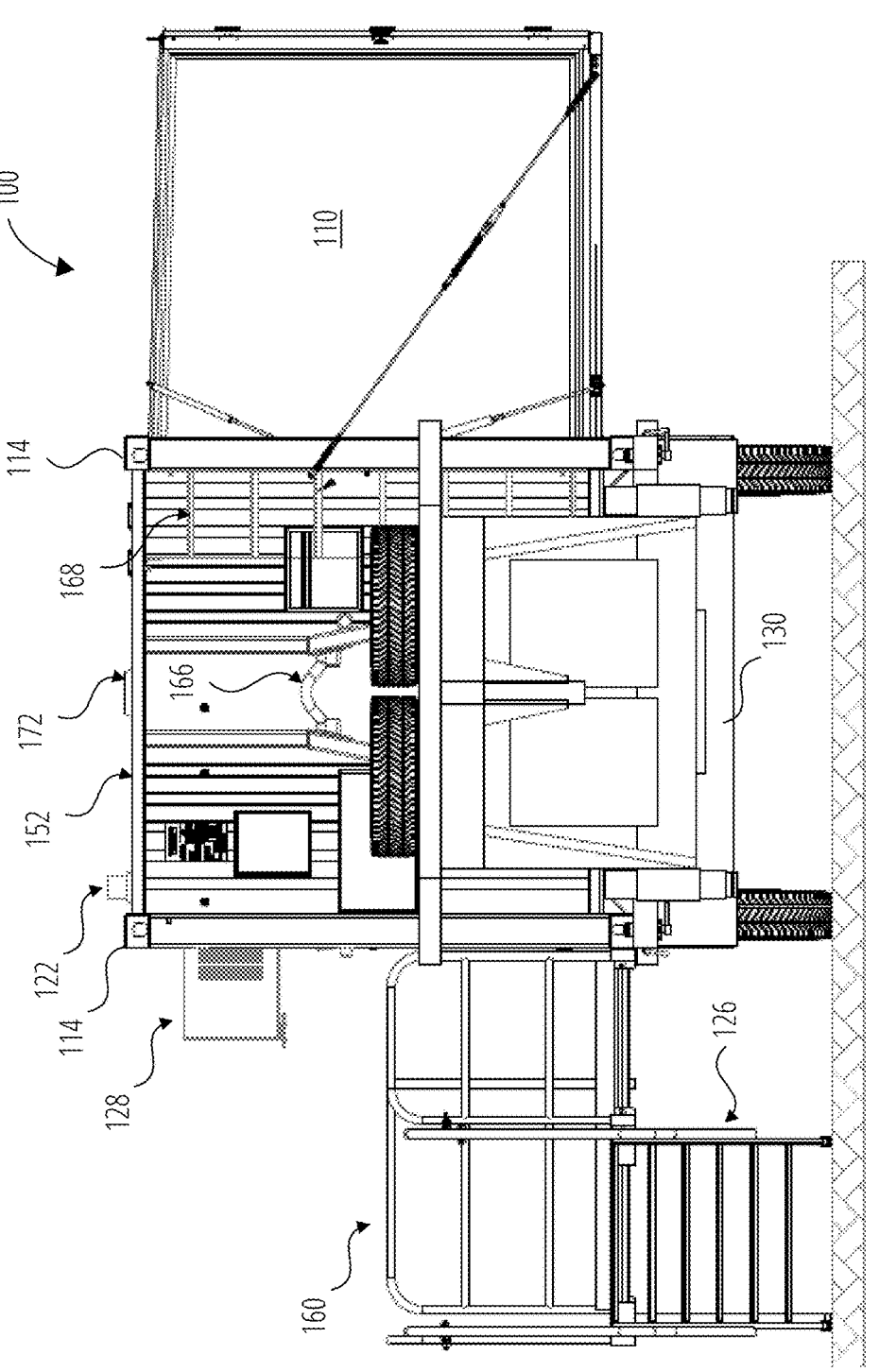
FIG. 1C illustrates a front view of the exemplary workspace/container of FIGS. 1A and 1B.

FIG. 1C illustrates a front view of the exemplary workspace/container of FIGS. 1A and 1B. The movable workspace 100 as shown in this view includes the expansion workspace 110, the movement components 114, the antenna 122 (shown in the retracted position), the stairway 126, the air conditioner/heater 128, the top/roof 152, and the platform 160.

This front view also shows a winch hook 166 and a ladder 168. The winch hook 166 may be operable to connect to a hook of a winch (not shown) that may be operable to drag the movable workspace 100 onto the transport trailer 130, onto a bed of a truck, or the like. The winch hook 166, in an example, may also be considered a movement component.

The ladder 168 is positioned to allow a user to gain access to the top/roof 152 of the movable workspace 100, for example, to couple transport cables to the movement components 114, or assist with extending the antenna 122.

Also shown in this view is a global positioning system (GPS) beacon 172, which may be a transmitter or transmitter/receiver operable to transmit an encrypted global positioning system signal. In an example, the communication system or the GPS beacon 172 may, either at preset intervals, after a set period of time, after occurrence of an event (e.g., submersion in water), in response to an encrypted polling signal, or the like, operate to obtain a location of or report the location of the movable workspace 100.

It is also envisioned that the movable workspace 100 has a configuration in which the movable workspace 100 is operable to move on its own power. For example, instead of being static structure points, such as movement component 114 shown and described thus far, the movement component may be an engine that provides a hydraulically or electro-mechanically powered, rail-like or tracked system that is operable to provide a "rover mode" that enables the movable workspace 100 to move under its own power. This feature provides the advantage of allowing the movable workspace 100 to remain close to front lines of a battlefield or to take evasive actions in a battlefield environment.

Figure 1D:
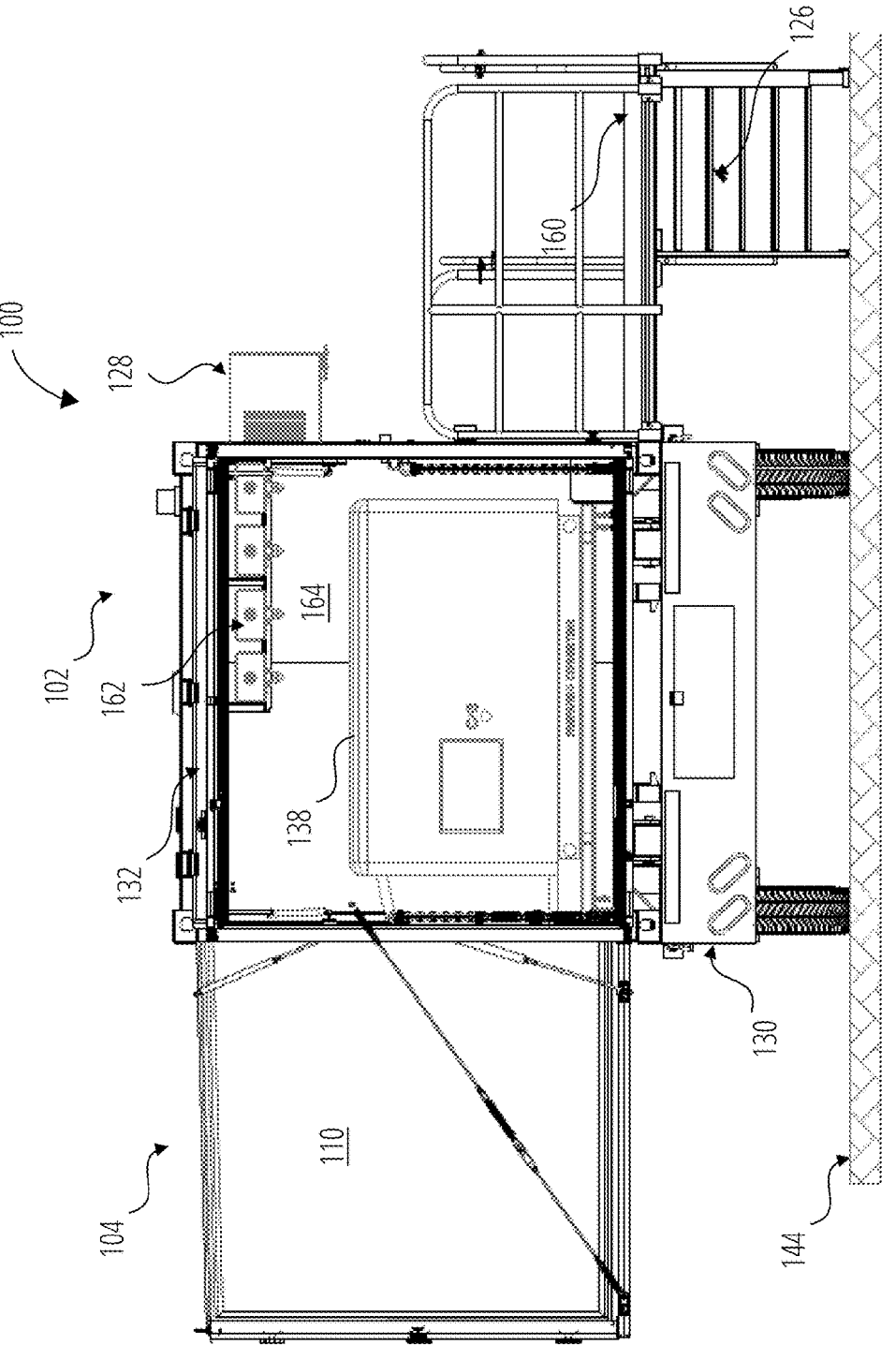
FIG. 1D illustrates a rear view of the exemplary workspace/container of FIGS. 1A, 1B and 1C.

FIG. 1D illustrates a rear view of the exemplary workspace/container of FIGS. 1A, 1B and 1C. In this rear view, the expansion workspace 110 is shown expanded on one side of the movable workspace 100 with the platform 160 and stairway 126 positioned on another side of the movable workspace 100.

This view also shows rear doors 132, which are operable to open to allow access to the generator 138.

This view also shows the generator 138 within the movable workspace 100 positioned above the transport trailer 130. The generator 138 may weigh over 1000 pounds, which enables the deployable expansion compartment 104 (i.e., extending enclosed work area) to extend from the primary compartment 102 (i.e., primary enclosed work area) and cantilever over an edge of the transport trailer 130.

In another example, the movable workspace 100 is operable to be positioned on leveling jacks 162, which may be stowed when the movable workspace 100 is being transported. The leveling jacks 162 may be configured to be positioned in each corner of the movable workspace 100. For example, the leveling jacks 162 may be configured to be positioned opposite each of the movement components 114. When the movable workspace 100 is equipped with the generator 138, the movable workspace 100 is configured to enable the deployable expansion compartment 104 (i.e., extending enclosed work area) to extend from the primary compartment 102 (i.e., primary enclosed work area) and cantilever over an edge of the transport trailer 130.

In the examples, the movable workspace 100 is shown with the deployable expansion compartment 104 extended from the primary compartment 102 to maximize workspace when the movable workspace 100 is in use. It is also envisioned that the movable workspace 100 is usable for repair/fabrication work and able to operate when the deployable expansion compartment 104 is not extended from the primary compartment 102 (i.e., remains embedded within the primary compartment 102). For example, work equipment within the expansion space is operable and portions of the storage in the primary area are accessible to workers when the deployable expansion compartment 104 is not extended from the primary compartment 102. In addition, support systems, such as electrical, air conditioning, lighting, and the like may be functional. This alternate configuration of the movable workspace 100 allows work to be conducted while the mobile workspace 100 is transported, for example, by ship, trailer, airplane, helicopter, or the like.

Figure 2:
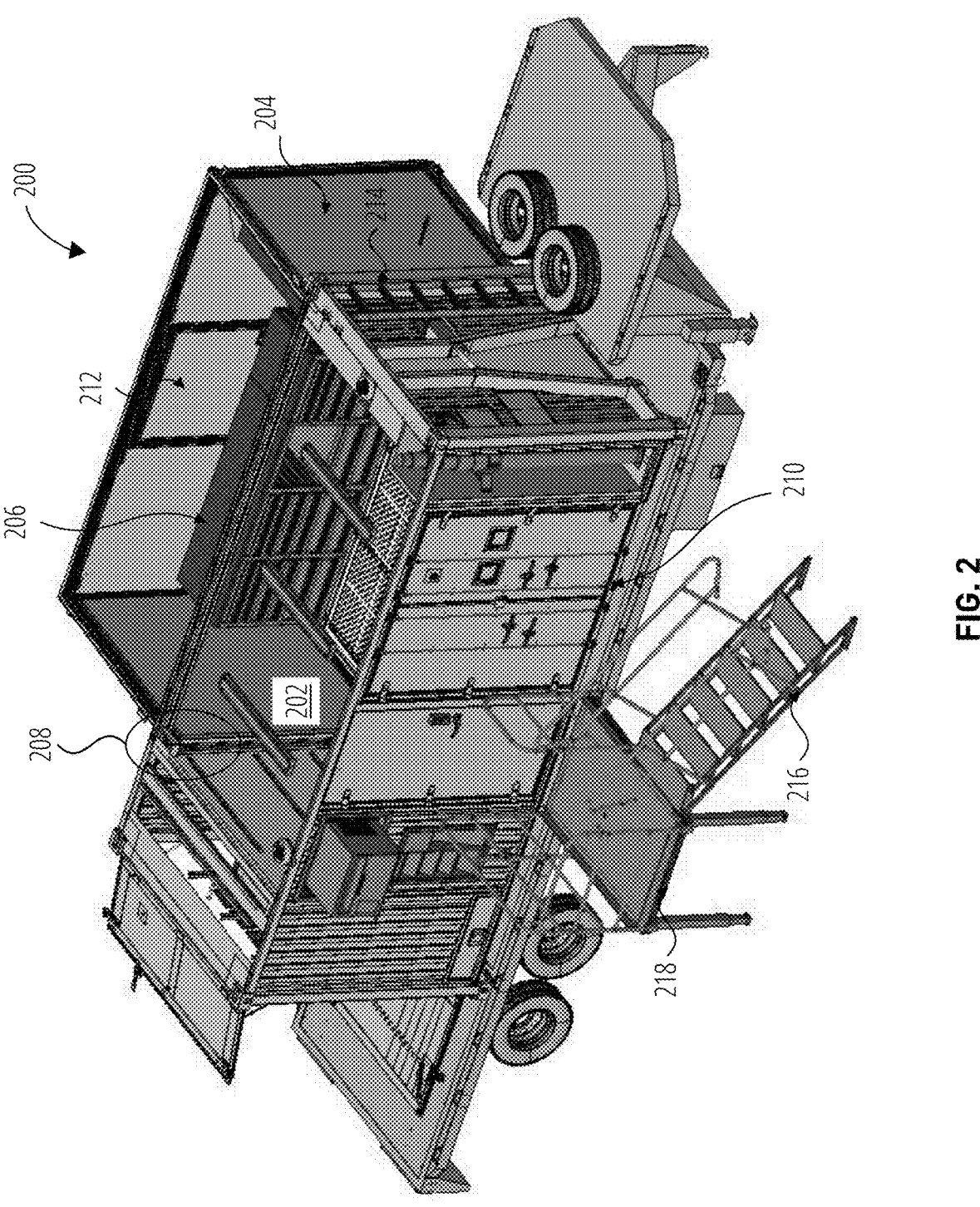
FIG. 2 illustrates a cutaway, front, left perspective view of the exemplary workspace/container (with the roof shown removed).

FIG. 2 illustrates a cutaway, front, left perspective view of the exemplary workspace/container (with the roof removed). This view of a reconfigurable, transportable enclosed workspace 200, which is similar to the movable workspace 100 shown in the examples of FIGS. 1A-1D.

FIG. 2 shows the primary enclosed work area 202 and the extending enclosed work area 204. In the extending enclosed work area 204, a workbench 206 is shown positioned against a side wall and across from an opening in the primary enclosed work area 202.

In this view, an intersection 208 of the primary enclosed work area 202 and the extending enclosed work area 204 is shown. The intersection of primary enclosed work area and extending enclosed work area 208 may be configured to enable the extending enclosed work area 204 to mesh with (or within) the primary enclosed work area 202. The intersection 208 may be configured with high-strength rollers, or the like that enable the extending enclosed work area 204 to roll into the primary enclosed work area 202. The intersection of primary enclosed work area and extending enclosed work area 208 may be a first intersection, and a second intersection (not shown) may be in the area within the primary enclosed work area 202 opposite the ladder 214. The intersections 208 may be operable to allow the floor of primary enclosed work area 202 and a floor of the extending enclosed work area 204 to be substantially aligned (e.g., the respective floors are substantially level) with one another when the reconfigurable, transportable enclosed workspace 200 is in a work state.

The side doors 210 are shown blocked by the stairway or ramp 216. When work equipment (not shown in this example) is to be inserted into the reconfigurable, transportable enclosed workspace 200 via the side doors 210, the stairway or ramp 216 is either not yet installed or is easily removed from platform 218.

Figure 3:
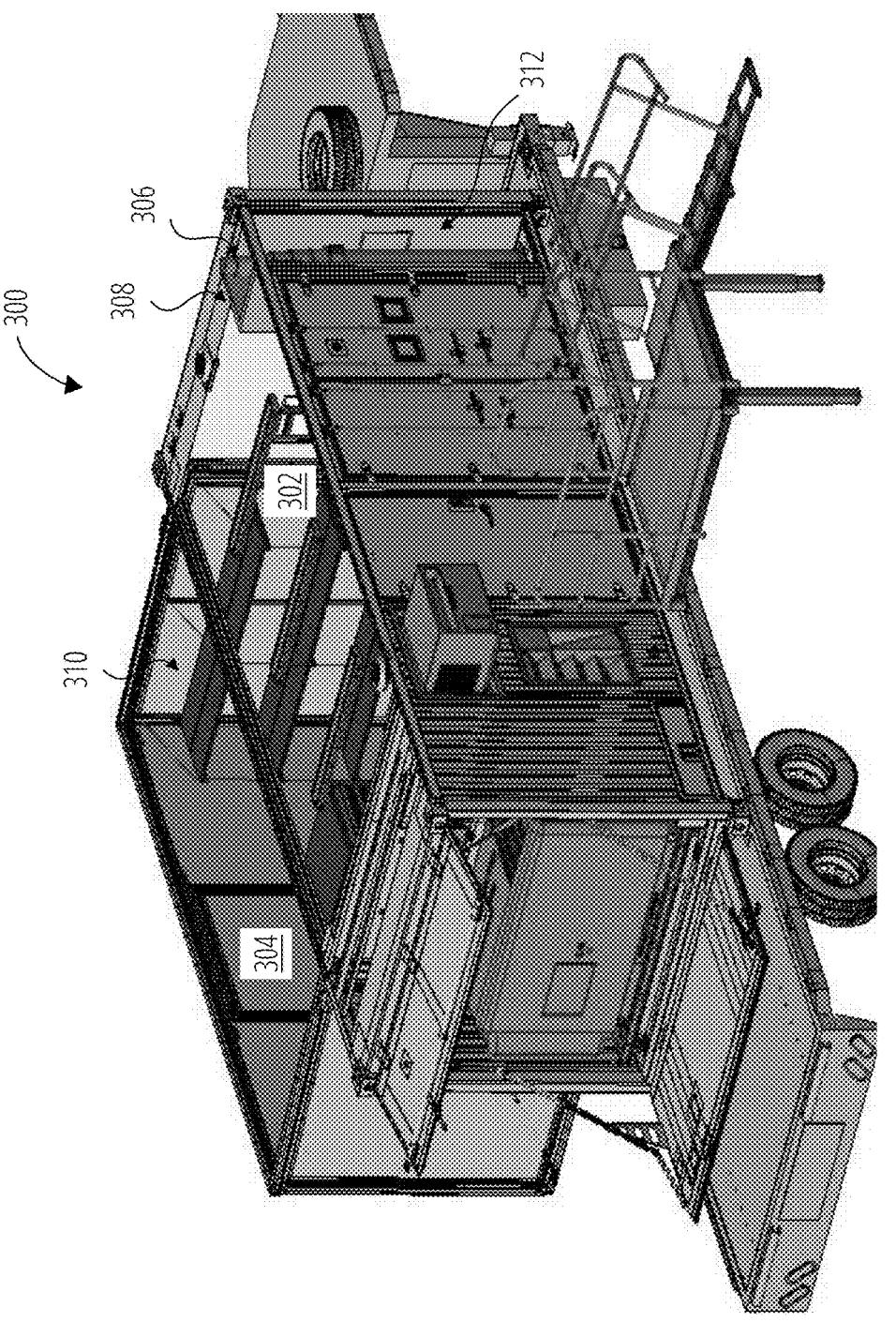
FIG. 3 illustrates a rear, left perspective view of the exemplary workspace/container (with the roof shown removed).

FIG. 3 illustrates a cutaway, rear, left perspective view of the exemplary workspace/container (with the roof removed). In this example, the reconfigurable, transportable enclosed workspace 300 includes a primary enclosed work area 302, and an extending enclosed work area 304. The roof or top is not shown for convenience and ease of illustration of the internal features of the reconfigurable, transportable enclosed workspace 300. Other features are also included and are substantially similar to those other features that have been described in more detail in earlier examples. Accordingly, a detailed description of the previously described features is not provided to avoid repetition.

In an example configuration, the primary enclosed work area 302 may include the antenna 306 and an antenna enclosure 308. The antenna 306 is substantially similar to the antenna 122 of FIGS. 1A-1D and no further discussion is needed. In this example, the antenna 306 is separated from the primary enclosed work area 302 by antenna enclosure 308. The antenna enclosure 308 may be two walls that enclose the corner of the primary enclosed work area 302. Alternatively, the antenna enclosure 308 may be a cylindrical section that terminates at the two walls of the primary enclosed work area 302. The antenna enclosure 308 is configured to be waterproof and gasproof, but is also configured to allow for connect of the antenna 306 to communication equipment (not shown in this example), while remaining waterproof and gasproof.

In addition, the extending enclosed work area 304 may include removable storage shelving 310. The removable storage shelving 310 may be larger or smaller than.

Figure 4:
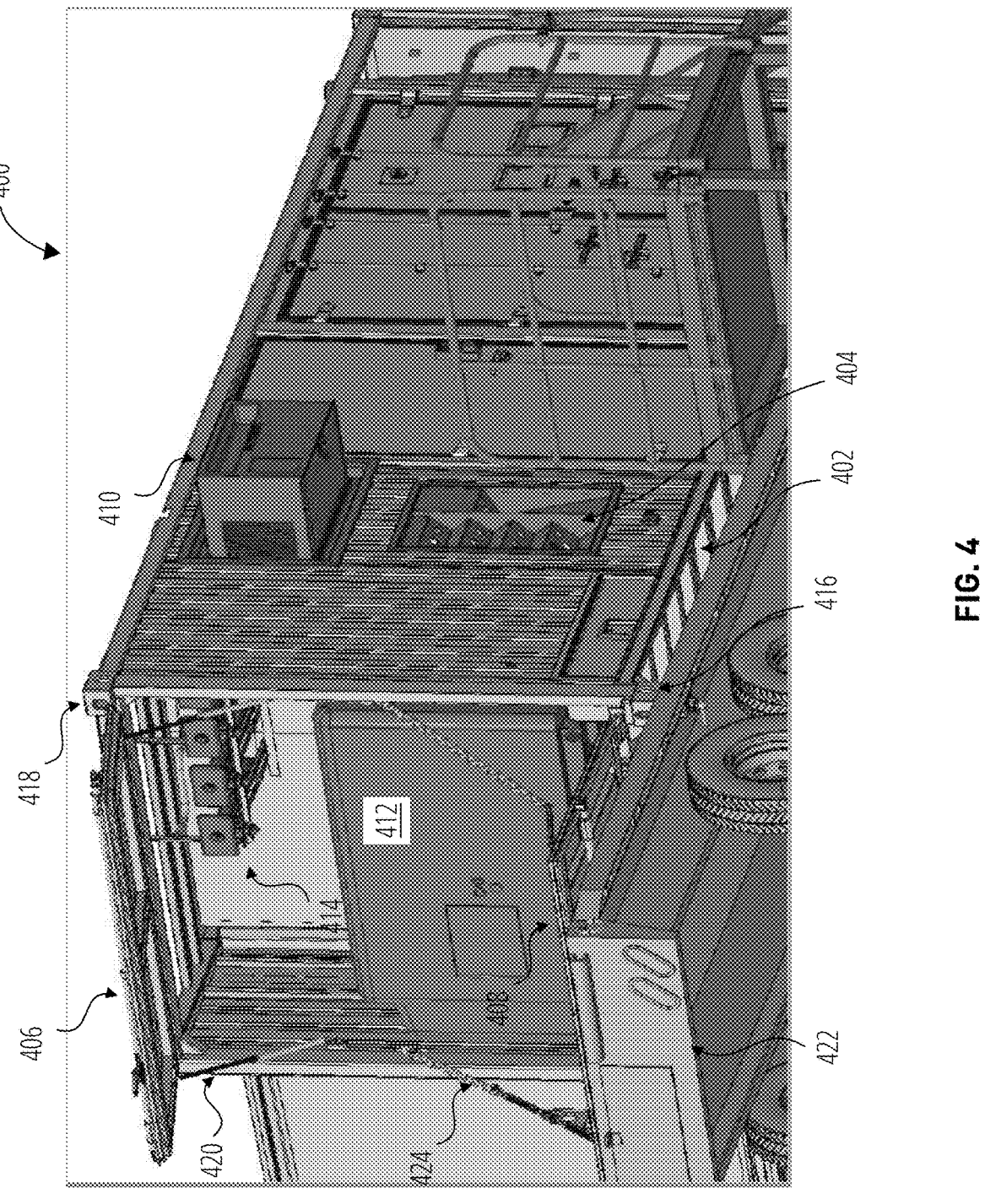
FIG. 4 illustrates a ground-level upward perspective view of the exemplary workspace/container.

FIG. 4 illustrates a ground-level upward perspective view of the exemplary workspace/container. This view of the movable workspace 400 is from the perspective of the ground, such as surface 144. From this view, an example of the structure of the floor 402 (or bottom) is shown. The floor 402 may be formed from a number of rigid panels, such as steel, carbon fiber, aluminum, or the like. Coupled to the floor 402 on the exterior of movable workspace 400 may be a bottom or floor movement component 416. The floor movement component 416 shown in FIG. 4 is one of at least four floor movement components that are at least positioned opposite a top or roof movement component, such as 418, and is positioned beneath the primary area or primary enclosed work area at the exterior of the movable workspace 400.

The view of FIG. 4 also provides an example configuration and orientation of the air conditioner/heater 410 with respect to the power entry 404. The power entry 404 may be a point of connection for shore power cables that provide power to the movable workspace 400 when an electrical power source 412 is not provided or needs to be replenished. For example, the electrical power source 412 may be a generator that requires diesel or gasoline fuel, or hydrogen fuel. Alternatively, the electrical power source 412 may be a battery pack or the like that can be recharged via an external power source connected to the power entry 404.

As mentioned previously, the rear doors of a movable workspace 400 may be clam-shell doors such as upper rear door 406 and lower rear door 408. The upper rear door 406 opens upwards toward the roof of the movable workspace 400 and may be held in place by hydraulic or pneumatic pistons, such as piston 420. The lower rear door 408 is lowered toward the transport trailer 422 and is held off of the transport trailer 422 by chain 424.

Figure 5:
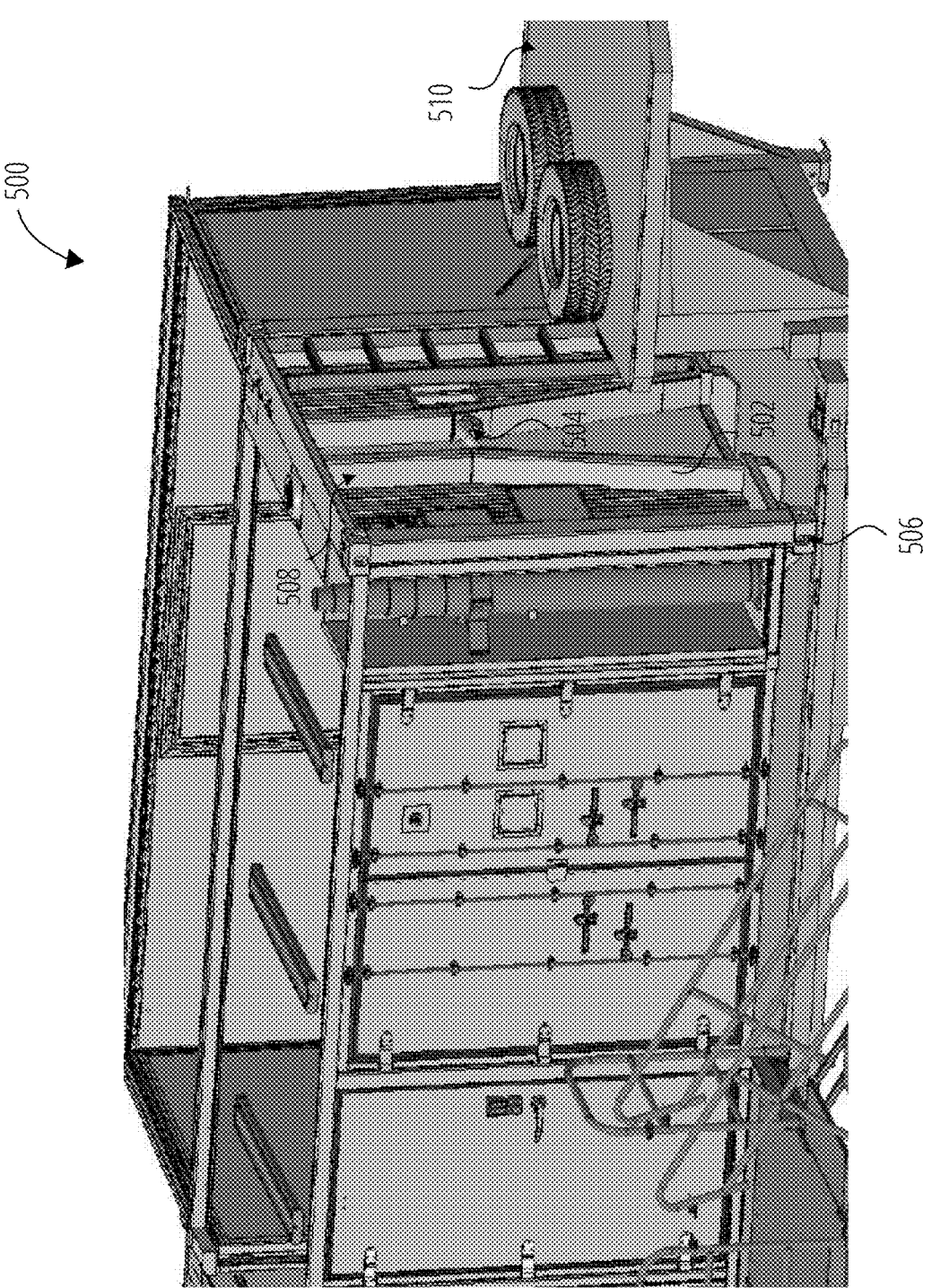
FIG. 5 illustrates close-in, left perspective view of the exemplary workspace/container (with the roof shown removed).

FIG. 5 illustrates close-up, left perspective view of the exemplary workspace/container (with the roof removed). In this example, the supporting structure of the winch hook 504 is shown in more detail. The winch hook supporting structure may include of a pair of lower A-frame struts 502 and a pair of upper A-frame struts 508 between which is positioned the winch hook 504. For example, a respective upper A-frame strut 508 may be welded to a respective lower A-frame strut 502. The winch hook 504 may be welded to an upper portion on each of the lower A-frame struts 502. The winch hook 504 and the supporting structure are configured to have sufficient strength to allow the movable workspace 500 to be pulled by a winch (not shown) or similar device onto the transport trailer 510 or a transport vehicle (not shown).

Figure 6:
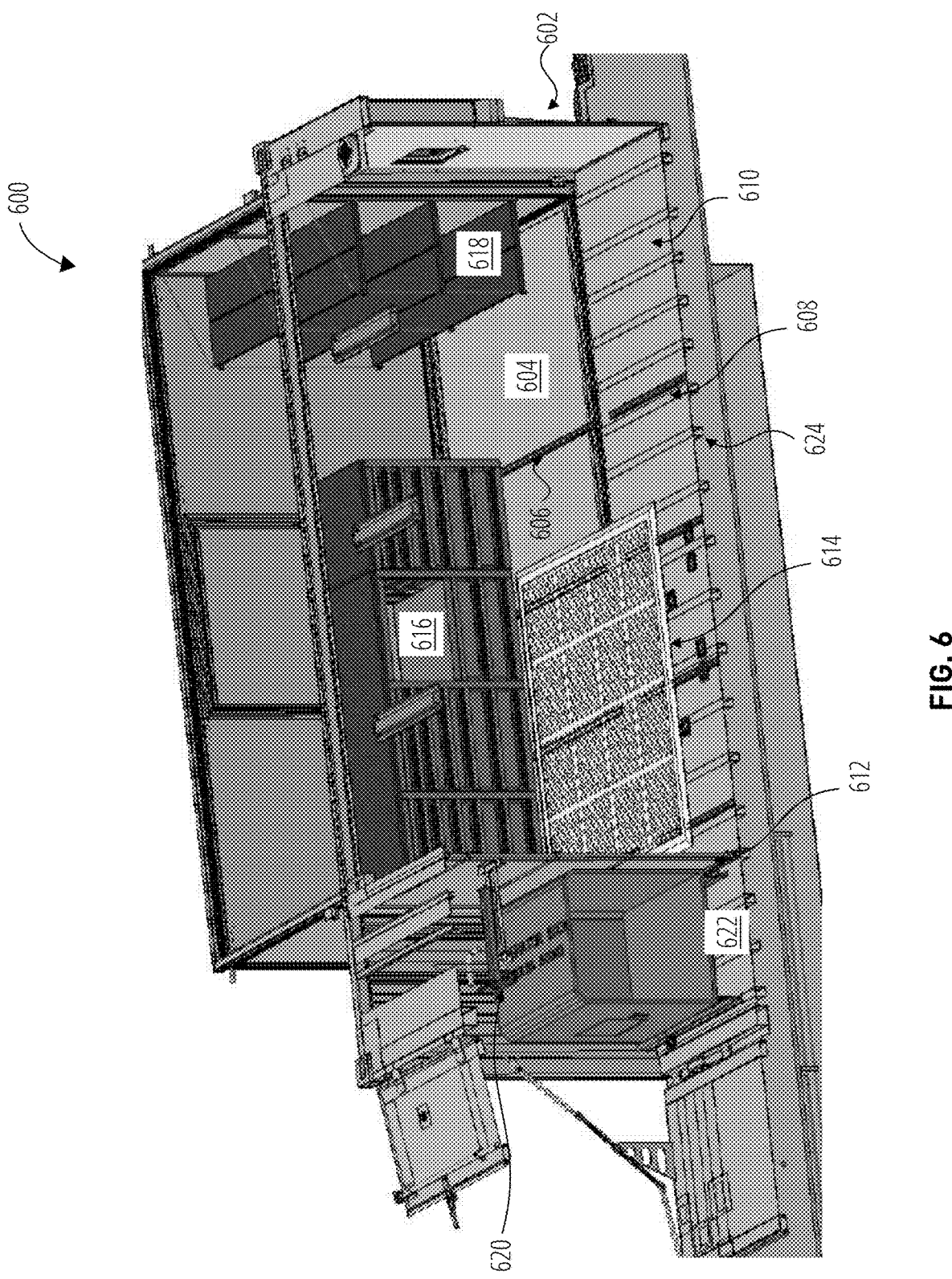
FIG. 6 illustrates a cut-away, left perspective view of the exemplary workspace/container.

FIG. 6 illustrates a cut-away, left perspective view of the exemplary workspace/container. The exemplary reconfigurable, transportable enclosed workspace 600 in this example includes a primary enclosed work area 602, an extending enclosed work area 604, an expansion connection point 606, a primary connection point 608, a floor 610, a separating wall 612, a non-slip mat 614, a workbench 616, and a removable storage shelving 618.

In this cutaway view, the alignment of the expansion connection point 606 with the primary connection point 608 is shown. This alignment enables work equipment (not shown in this example) to be configured to span between the primary enclosed work area 602 and the extending enclosed work area 604 within the reconfigurable, transportable enclosed workspace 600. There may be a number of expansion connection points 606 and primary connection points 608 that align.

An example arrangement of the workbench 616 and removable storage shelving 618 is also shown as is placement of the non-slip mat 614. The non-slip mat 614 may be positioned over one or more strips of expansion connection points 606.

The view in FIG. 6 also shows the separating wall 612 that separates the primary enclosed work area 602 from power source area 622. The power source area 622 is a space occupied by an electrical power source, such as the previously mentioned generator or battery pack.

Also, shown in the power source area 622 is the leveling jack and stowage 620 that is shown positioned above the electrical power source. However, the leveling jack and stowage 620 may be positioned at anywhere within the power source area 622 having space to accommodate the leveling jack and stowage 620.

The floor 610 is shown to be reinforced with several cross members 624 that are configured to support the additional weight of work equipment installed in the reconfigurable, transportable enclosed workspace 600.

Figure 7:
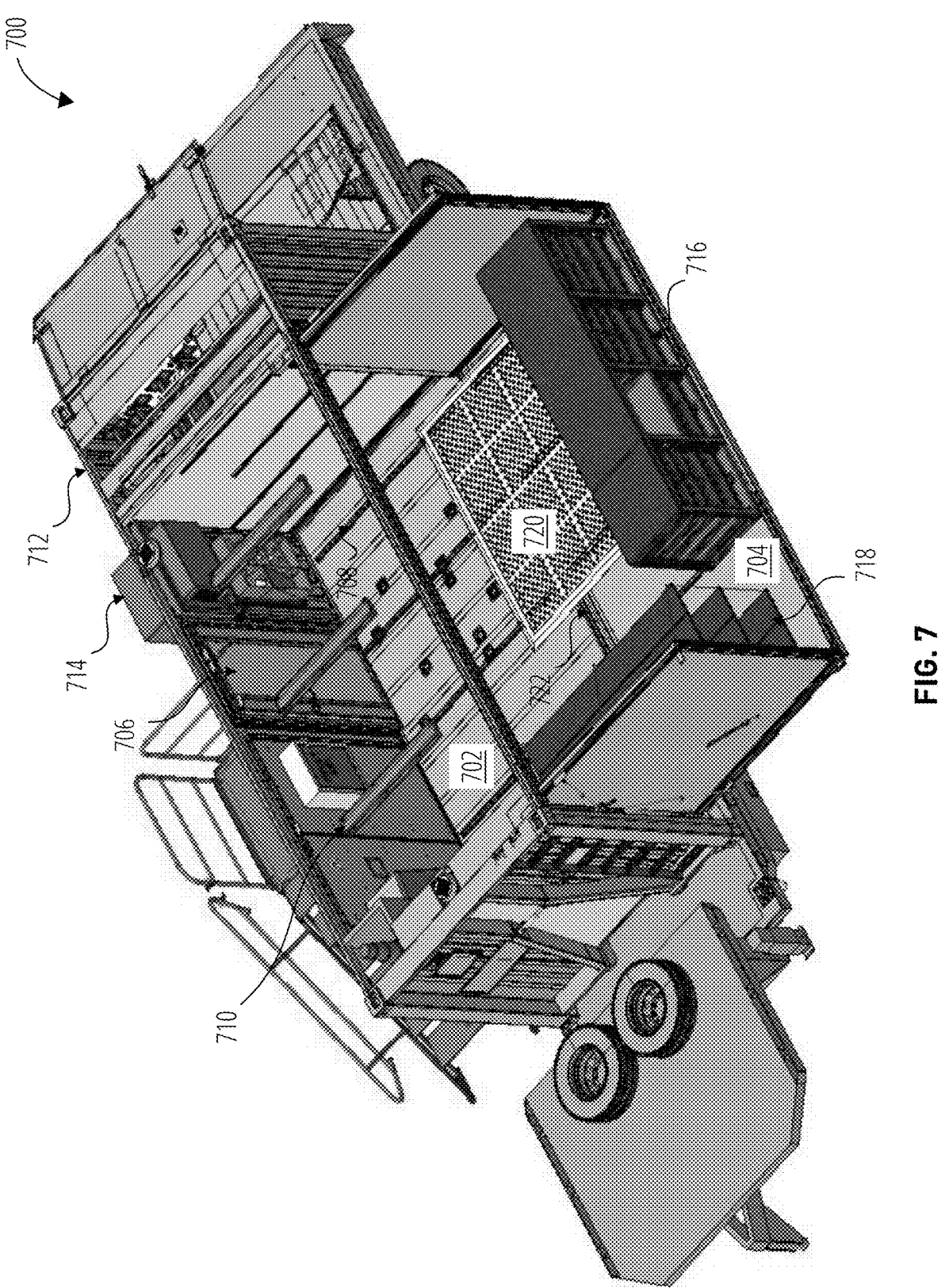
FIG. 7 illustrates a cutaway, right-front perspective view of the exemplary workspace/container.

FIG. 7 illustrates a cutaway, right-front perspective view of the exemplary workspace/container. This view shows the overall arrangement of the movable workspace 700 when in a work state. A "work state" refers to a configuration of the movable workspace 700 (i.e., reconfigurable, transportable enclosed workspace) in which the expansion workspace 704 is extended from the primary workspace 702, and work equipment is able to be positioned in and able to operate in the primary workspace 702, the expansion workspace 704, or in both. For example, the work equipment may be separately located in the primary workspace 702 and the expansion workspace 704, or may be positioned and secured across a boundary 722 of the primary workspace 702 and expansion workspace 704. In another example, the movable workspace 700 includes lighting fixtures 710, which may light emitting diode (LED) lighting, which are capable of producing visible light or near infrared light within substantially all of the interior space of the movable workspace 700.

This view shows the main entry 706 from within the movable workspace 700 and shows the placement of a plurality of primary connection points 708 within primary workspace 702. In addition, the exemplary placement of the workbench 716 and removable storage shelving 718 within the movable workspace 700. The workbench 716 and the removable storage shelving 718 may be smaller or larger. For example, a smaller workbench 716 may be positioned beneath or adjacent to a smaller set of removable storage shelving 718. The example arrangement of the workbench 716 and removable storage shelving 718 is also shown as is placement of the non-slip mat 720. The non-slip mat 720 may be positioned over one or more strips of expansion connection points 708 and/or boundary 722.

The view also illustrates that, in one or more embodiments, the power source area 712 may be entirely separated from the primary workspace 702 and expansion workspace 704. However, depending upon the type of electrical power source, the power source area 712 may be configured to allow access from the primary workspace 702. Alternatively, if shore power exists at the location to which the movable workspace 700 is being transported, the power source area 712 may be utilized as additional workspace or additional storage space.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the numerous examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The following is a glossary of terms that may be used to further define and describe the individual components and their relationship with other components as described herein. Some of these definitions may be repetitive of definitions cited above.

"Communication equipment" refers to electromagnetic spectrum and optical devices that are operable to transmit information signals. The communication equipment may include a transceiver, a camera and a microphone and be operable communicatively connect to the internet, a cellular network, a secure encrypted network, a combination thereof, or the like "Deployable expansion compartment" refers to a portion of the movable workspace that includes an expansion workspace having an expansion area, and at least one expansion connection point adapted to secure the work equipment within the expansion area. The expansion workspace is usable when the deployable expansion compartment is deployed.

"Expansion area" refers to a space within the expansion workspace of the movable workspace which provides space for work equipment and the use of the work equipment.

"Expansion connection point" refers to a structure that is adapted to releasably secure work equipment within the expansion area of a movable workspace.

"Expansion workspace" refers to a part of the deployable expansion compartment that includes an expansion area that includes expansion connection points and that is a place where work equipment may be used when the deployable expansion compartment is deployed.

"Extended work equipment connection points" refers to a structure that is adapted to releasably secure work equipment within the extending enclosed work area of a reconfigurable, transportable enclosed workspace.

"Extending enclosed work area" refers to a part of the reconfigurable, transportable enclosed workspace that includes extended work equipment connection points adapted to enable the work equipment to be releasably secured in the extending enclosed work area, where the extending enclosed work area is configured to mesh with the primary enclosed work area in a transport state, and extend from the primary enclosed work area in a work state.

"Lighting fixtures" refers to systems capable of producing visible light or near infrared light within substantially all of the interior space of the movable workspace.

"Main entry" refers to an entryway for occupants of the movable workspace to enter and exit the movable workspace.

"Movable workspace" refers to a structure having a primary compartment, a deployable expansion compartment, and a movement component.

"Power entry" refers to equipment for distributing electrical power generated by an electrical power source, such as a Generator or an electrical supply cable, within the movable workspace or the reconfigurable, transportable enclosed workspace.

"Primary area" refers to a space within the expansion workspace of the movable workspace which provides space for work equipment and the use of the work equipment.

"Primary compartment" refers to a portion of the movable workspace that includes a primary workspace having a primary area, and at least one primary connection point adapted to secure work equipment within the primary area.

"Primary connection point" refers to a structure that is adapted to releasably secure work equipment within the primary area of a movable workspace.

"Primary enclosed work area" refers to a portion of the reconfigurable, transportable enclosed workspace that includes a plurality of work equipment connection points adapted to enable work equipment to be releasably secured. In addition, when the reconfigurable, transportable enclosed workspace is in a transport state the primary enclosed work area is configured to accept an extending enclosed work area that meshes with the primary enclosed work area.

"Primary workspace" refers to an area of a movable workspace that includes a primary area for work equipment to be coupled to a primary connection point and enables use of the work equipment.

"Reconfigurable, transportable enclosed workspace" refers to an enclosed work area having a primary enclosed work area and an extending enclosed work area that increases the area of the enclosed work area, and that enables configuration of work equipment into a number of different orientations for optimal workspaces and operation.

"Removable storage shelving" refers to shelving that is releasably secured to a wall of the workspace.

"Side doors" refers to entryway that is configured to allow work equipment, workbenches, and larger equipment and devices to be placed in and removed from the movable workspace.

"Stairway" refers to ground level connection to the main entry that may include a ramp, elevator, or the like to comply with the Americans with Disabilities Act requirements.

"Top" refers to a rigid roof structure that couples to the sides or walls of the movable workspace to provide structure integrity. The top or roof is opposite a floor or bottom of the movable workspace container.

"Transport state" refers to a configuration of the reconfigurable, transportable enclosed workspace in which the extending enclosed work area is meshed with the primary enclosed work area, and the reconfigurable, transportable enclosed workspace is configured to be transported by a transport vehicle.

"Transport trailer" refers to is a wheeled or tracked platform that is configured to be coupled to a transport vehicle.

"Transport vehicle" refers to airplane, helicopter, submarine, truck, forklift, container carrier, wheeled frame, tracked frame.

"Universal connection mechanism" refers to a securing system that is adaptable to establish a secure coupling between any work equipment and a primary connection point or expansion connection point (or work equipment connection points and extended work equipment connection points).

"Ventilation plumbing" refers to structural intake and exhaust airways configured to provide sufficient breathable air for occupants of the movable workspace. The ventilation plumbing is adapted to extend to allow the movable workspace to be positioned beneath ground in a protected environment.

"Wall" refers to sides of the movable workspace (i.e., reconfigurable, transportable enclosed workspace) that are structurally rigid and configured to provide exterior support for the movable workspace.

"Waterproof seal" refers to adaptations to junction points of various components of the movable workspace, such as doors, doorways, intersections of primary compartment and deployable expansion compartment (primary enclosed work area and extending enclosed work area), perimeter points and the like, that form impenetrable barriers to water. The waterproof seal also has a pressure rating to remain waterproof, for example, at a depth of 10 meters for 36 hours, or the like.

"Work equipment" refers to equipment having securing equipment operable to connect to connection points of respective workspaces, and whose location within the workspace is non-permanent. Examples of work equipment includes tools, 3D printer, a lathe, a saw, a grinder, a welding machine, forging equipment, a drill press, a workbench, an oven, a measuring device, imaging equipment, medical equipment, communication equipment, computing devices, or image analysis equipment.

"Work equipment connection points" refers to one or more of a track system, in-floor and/or in-wall connection points within the workspace that are configured to couple with securing equipment of the work equipment.

"Work state" refers to a configuration of the reconfigurable, transportable enclosed workspace in which the extending enclosed work area is extended from the primary enclosed work area, and work equipment is able to be positioned to permit operation of the work equipment in the primary enclosed work area, the extending enclosed work area, or both.

"Workbench" refers to an elevated platform for placement of a work piece for repair, refurbishing, tuning, sighting, evaluation, troubleshooting or the like. The workbench may also be reconfigurable for height, angle or the like.

What is claimed is:

1. A movable workspace for use in a battlefield and/or contested environment, comprising:
 a primary compartment including:
  side doors in a side-by-side arrangement operable to allow work equipment to be placed in and removed from the primary compartment,
  a primary workspace having a primary area including a floor, and
  a plurality of primary connection points adapted to releasably secure removable work equipment within the primary workspace;
 a deployable expansion compartment including:
  an expansion workspace having an expansion area including a floor, wherein the floor of the primary workspace and the floor of the expansion workspace are separate from one another, and a plurality of expansion connection points adapted to secure the removable work equipment within the expansion workspace, and the plurality of primary connection points and the plurality of expansion connection points are configured to enable the removable work equipment to be unsecured from the expansion connection points and the primary connection points and be moved to span or be positioned between the primary workspace and/or the expansion workspace;
 an intersection of the primary workspace and the expansion workspace configured to enable the expansion workspace to roll into the primary workspace; and
 a movement component to facilitate movement of the movable workspace, wherein, when the movable workspace is in a work state, at least one primary connection point of the plurality of primary connection points in the primary workspace is adapted to align with at least one expansion connection point of the plurality of expansion connection points in the expansion workspace when in the battlefield and/or the contested environment.

2. The movable workspace of claim 1, wherein the at least one primary connection point of the plurality of primary connection points and the at least one expansion connection point of the plurality of the expansion connection points is, respectively, adapted to releasably secure the removable work equipment to the floor of the primary workspace or the floor of the expansion workspace.

3. The movable workspace of claim 1, wherein the at least one of the primary connection point of the plurality of primary connection points and the at least one expansion connection point of the plurality of the expansion connection point is adapted to releasably secure the removable work equipment to a wall of the primary workspace or the expansion workspace when the removable work equipment positioned to permit operation of the removable work equipment.

4. The movable workspace of claim 1, wherein the at least one primary connection point of the plurality of primary connection points and the at least one expansion connection point of the plurality of the expansion connection point are configured to couple to the removable work equipment.

5. The movable workspace of claim 1, wherein the removable work equipment comprises at least one of a 3D printer, a lathe, a saw, a grinder, a welding machine, forging equipment, a drill press, a workbench, an oven, a measuring device, imaging equipment, medical equipment, communication equipment, computing devices, or image analysis equipment.

6. The movable workspace of claim 1, wherein the movable workspace is adapted to be moved at a speed of at least 60 miles per hour.

7. The movable workspace of claim 1, wherein the movement component comprises an engine, a winch, an electric motor, or attachment points enabling transport of the movable workspace about the battlefield or the contested environment.

8. The movable workspace of claim 1, wherein the movement component comprises:
 one or more coupling points at top corners and bottom corners of the movable workspace that in combination are adapted to allow the movable workspace to be transported by a transport vehicle within the battlefield or the contested environment.

9. The movable workspace of claim 1, further comprising:
 a power entry coupled to an electrical power source; and
 at least one electrical outlet positioned adjacent to the at least one primary connection point or the at least one expansion connection point.

10. The movable workspace of claim 1, wherein the primary compartment further comprises:
 a top having interior attachment points for lighting fixtures, and
 the movement component includes a plurality of movement components having exterior attachment points at exterior points of the top adapted to enable transport of the movable workspace.

11. The movable workspace of claim 1, wherein the deployable expansion compartment is slidably coupled to the primary compartment.

12. The movable workspace of claim 1, further comprising:
 removable storage shelving coupled to shelving connection points within the deployable expansion compartment.

13. The movable workspace of claim 10, further comprising:
 power entry coupled to an electrical power source; and
 at least one electrical outlet positioned adjacent to the at least one primary connection point.

14. A reconfigurable, transportable enclosed workspace for use in a battlefield environment and/or contested environment, comprising:
 a primary enclosed work area including:
  a plurality of work equipment connection points adapted to enable work equipment to be releasably secured in the primary enclosed work area;
  an extending enclosed work area including a plurality of extended work equipment connection points adapted to enable the removable work equipment to be releasably secured in the extending enclosed work area; and
  ventilation plumbing adapted to extend above ground, wherein the ventilation plumbing allows the reconfigurable, transportable enclosed workspace to be positioned beneath ground in a protected environment, wherein:

the extending enclosed work area including a floor of the extending enclosed work area configured to mesh with the primary enclosed work area via intersections when the reconfigurable, transportable enclosed workspace is in a transport state, the intersections enable the extending enclosed work area including the floor to roll into the primary enclosed work area, and the extending enclosed work area including the floor of the extending enclosed work area is configured to extend from the primary enclosed work area when the reconfigurable, transportable enclosed workspace is in a work state and the plurality of work equipment connection points in the primary enclosed work area and the plurality of extended work equipment connection points in the extending enclosed work area are configured to enable the removable work equipment to be released and unsecured from the extended work equipment connection points and the work equipment connection points in the primary enclosed work area and be moved to span or be positioned between the primary enclosed work area and/or the extending enclosed work area within the battlefield and/or the contested environment.

15. The reconfigurable, transportable enclosed workspace of claim 14, further comprising:

removable work equipment, wherein the removable work equipment includes:

a three-dimensional printer, a grinder, a saw, a welding machine, a lathe, forging equipment, a drill press, a workbench, an oven, a measuring device, medical equipment, imaging equipment, communication equipment, computing devices, or image analysis equipment.

16. The reconfigurable, transportable enclosed workspace of claim 14, further comprising:

an antenna configured to be stored in a corner of and within the reconfigurable, transportable enclosed workspace, and operable to be coupled to communication equipment, wherein the antenna comprises a plurality of retractable segments operable to extend upwards and retract downwards through a roof of the reconfigurable, transportable enclosed workspace.

17. The reconfigurable, transportable enclosed workspace of claim 14, further comprising:

a power entry coupled to an electrical power source; and a plurality of electrical outlets positioned adjacent to one or more of the plurality of work equipment connection points or the plurality of extended work equipment connection points.

18. The reconfigurable, transportable enclosed workspace of claim 14, wherein the plurality of work equipment connection points and the plurality of extended work equipment connection points are configured to enable reconfiguration of work equipment within the primary enclosed work area, the extending enclosed work area, or both.

19. The reconfigurable, transportable enclosed workspace of claim 14, wherein the plurality of work equipment connection points and the plurality of extended work equipment connection points are adapted, when in the work state, to:

enable the removable work equipment to be coupled to respective work equipment connection points in the primary enclosed work area and to respective extended work equipment connection points in the extending enclosed work area, wherein the work equipment spans between the primary enclosed work area and the extended enclosed work area.

20. The reconfigurable, transportable enclosed workspace of claim 14, wherein the reconfigurable, transportable enclosed workspace is usable for work when the extending enclosed work area is not extended from the primary enclosed work area.

21. The reconfigurable, transportable enclosed workspace of claim 14, wherein the reconfigurable, transportable enclosed workspace is configured to be secured to a transport trailer via a plurality of coupling points.

22. The reconfigurable, transportable enclosed workspace of claim 14, wherein the primary enclosed work area and the extending enclosed work area have an intersection that is configured to enable the extending enclosed work area to roll into the primary enclosed work area.

23. The movable workspace of claim 1, further comprising:

ventilation plumbing adapted to extend above ground, wherein the ventilation plumbing allows the movable workspace to be positioned beneath ground in a protected environment.

24. A reconfigurable, transportable enclosed workspace in a battlefield and/or similar contested environment, comprising:

a primary enclosed work area including:

a plurality of work equipment connection points adapted to enable work equipment to be releasably secured in the primary enclosed work area;

an extending enclosed work area including a plurality of extended work equipment connection points adapted to enable the removable work equipment to be releasably secured in the extending enclosed work area; and ventilation plumbing adapted to extend above ground, wherein the ventilation plumbing allows the reconfigurable, transportable enclosed workspace to be positioned beneath ground in a protected environment, wherein:

the extending enclosed work area including a floor of the extending enclosed work area configured to mesh with the primary enclosed work area via intersections when the reconfigurable, transportable enclosed workspace is in a transport state, the intersections enable the extending enclosed work area including the floor to roll into the primary enclosed work area, and the extending enclosed work area including the floor of the extending enclosed work area is configured to extend from the primary enclosed work area when the reconfigurable, transportable enclosed workspace is in a work state, wherein, when the reconfigurable, transportable enclosed workspace is in a work state, the plurality of work equipment connection points in the primary enclosed work area are adapted to align with corresponding extended work equipment connection points in the extending enclosed work area in the battlefield and/or the contested environment and the plurality of work equipment connection points in the primary enclosed work area and the a plurality of extended work equipment connection points are configured to enable the removable work equipment to be released and unsecured from the extended work equipment connection points and the work equipment connection points in the primary enclosed work area and be moved between the primary enclosed work area and/or the extending enclosed work area within the battlefield and/or the contested environment.

* * * * *